United States Patent [19]
Geyer

[11] 4,008,366
[45] Feb. 15, 1977

[54] COUPLING FOR BUS BAR SYSTEM

[75] Inventor: Gerhard Geyer, Regensburg, Germany

[73] Assignee: Siemens Aktiengesellschaft, Munich, Germany

[22] Filed: Dec. 8, 1975

[21] Appl. No.: 638,659

[30] Foreign Application Priority Data

Dec. 12, 1974 Germany .......................... 2458925

[52] U.S. Cl. .......................... 174/88 B; 339/22 B; 339/244 UC; 339/265 F; 339/266 F; 403/394

[51] Int. Cl.² ...................... H02G 5/00; H02B 1/20; H01R 7/08

[58] Field of Search .............. 174/68 B, 70 B, 71 B, 174/72 B, 88 B, 88 S, 94 S, 99 B, 99 E, 129 B, 149 B, 171; 339/22 B, 244 R, 244 UC, 249 A, 263 L, 265 R, 265 F, 266 F; 24/135 M, 243 E; 403/393, 394, 396

[56] References Cited

UNITED STATES PATENTS

| 880,238 | 2/1908 | O'Hara et al. | 403/394 |
|---|---|---|---|
| 1,420,451 | 6/1922 | Schulze | 403/394 |
| 2,906,811 | 9/1959 | Fisher | 174/88 B X |
| 3,004,096 | 10/1961 | Rowe | 174/88 B |
| 3,095,469 | 6/1963 | Cataldo | 174/88 B |
| 3,180,924 | 4/1965 | Rowe | 174/88 B |

FOREIGN PATENTS OR APPLICATIONS 1,120,593   4/1956   France ........................... 339/265 F

*Primary Examiner*—Laramie E. Askin
*Attorney, Agent, or Firm*—Kenyon & Kenyon Reilly Carr & Chapin

[57] ABSTRACT

Sections of a bus bar stack are coupled together with insulating spacers between bars of different potentials, by a clamping device that embraces the stack, thereby avoiding the need for cutouts in the bars at the coupled junction. The form of the clamping device may be a U-shaped bracket encompassing the stack and having adjustable clamping means mounted on the leg ends for applying resilient clamping pressure on the stack through a pressure member bridging between the bracket legs. Alternatively, a support on one side of the stack and a clamping element spaced from the support are joined by levers. Adjustable clamping means on the ends of the clamping element apply clamping pressure on the stack through the levers. The support may form part of an enclosure for the bus bars and may include an insulated tray having offset slots for supporting the coupled bus bar sections in desired relation to each other.

5 Claims, 14 Drawing Figures

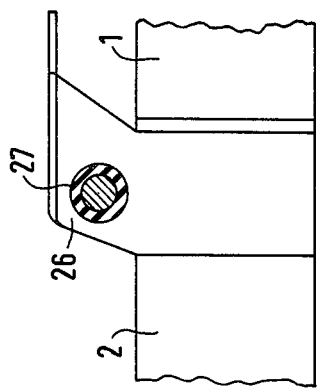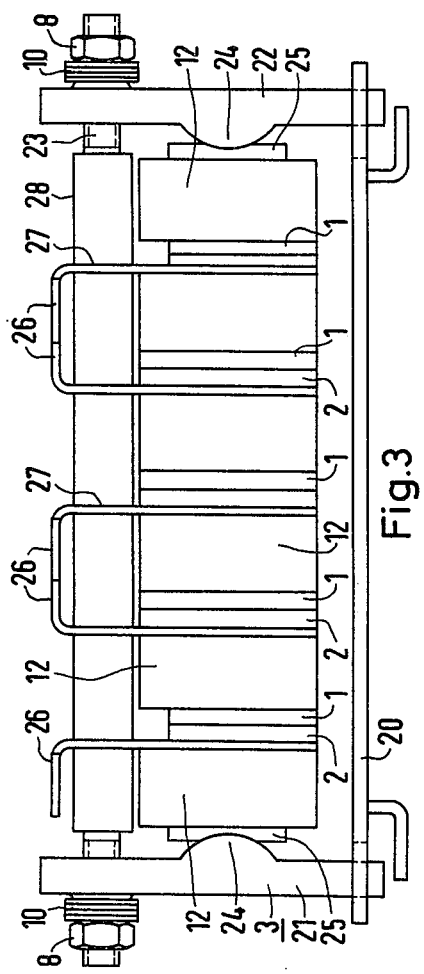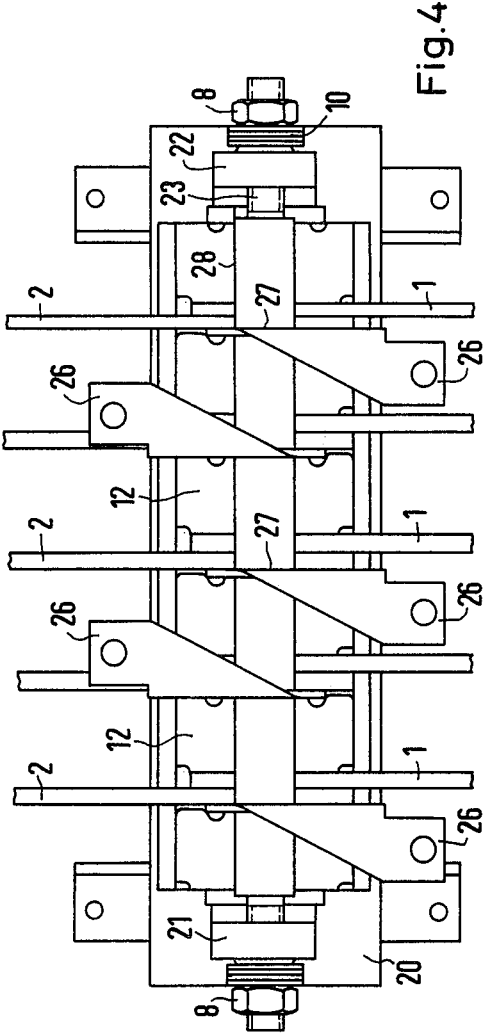

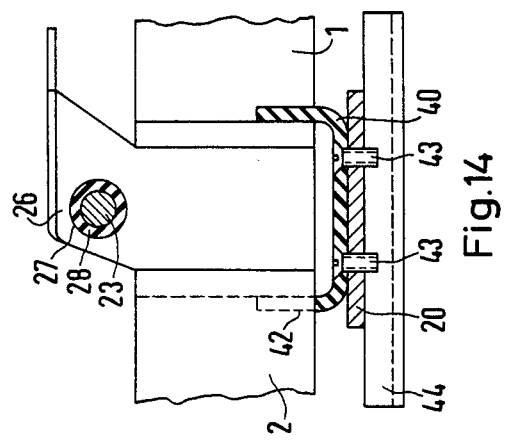
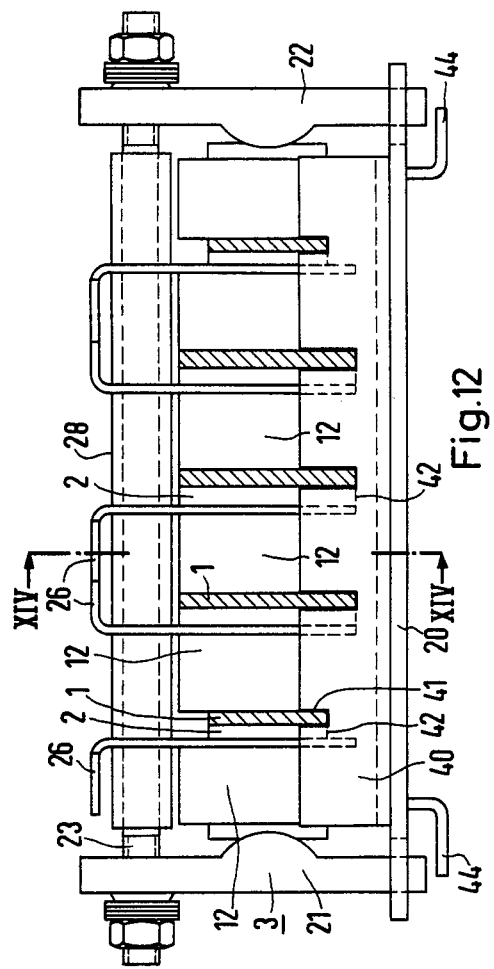
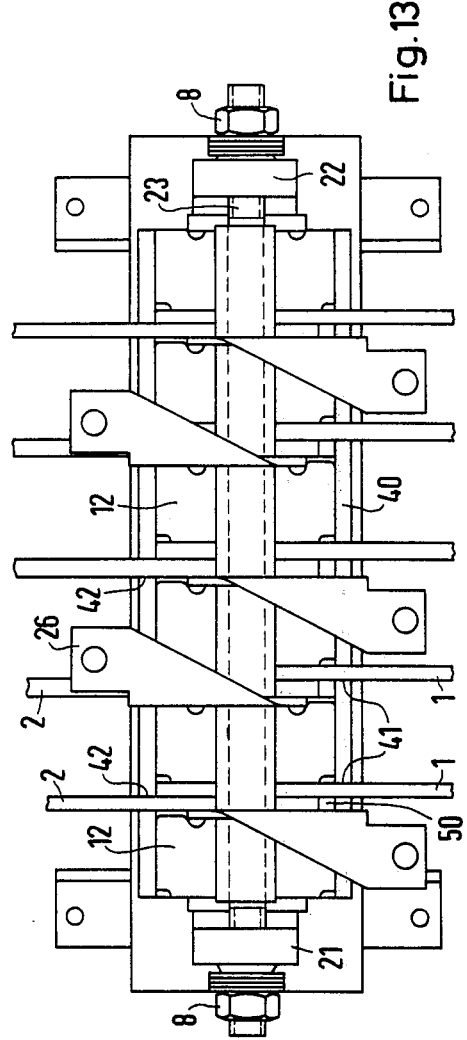

COUPLING FOR BUS BAR SYSTEM

BACKGROUND OF THE INVENTION

The present invention relates to a coupling for a bus system and particularly to a clamping device for joining sections of bus bars arranged in a stack, with bars at different potentials separated by insulating spacers.

In bus bar systems for distributing electric power at different potentials, the bars are commonly arranged in a stack of flat bars, the bars at different potentials being separated from one another by insulating spacers.

Commercially available couplings for bus bar systems usually have a single clamping bolt or tie bolt that is inserted in specially formed cutouts in the ends of the bar sections to be joined. The clamping bolt is normally provided with a nut, spring washers, and an end plate at one or both ends to transmit clamping pressure to the stack of bars and spacers. If branch connections must be made at any intermediate position along a section of bus bars, additional cutouts are required to allow a suitably insulated clamping bolt to pass through all the bars in the stack. The insulating spacers also require corresponding cutouts at the clamping point.

This conventional coupling arrangement requires cutting or shaping the ends of the bus bar sections before installation, as well as the intermediate branch points. Any subsequent changes or additions of branch lines is difficult, time consuming and expensive. Moreover, the cutout portions reduce the effective current carrying capacity of the bus bars.

SUMMARY OF THE INVENTION

It is an object of the present invention to provide a coupling arrangement that eliminates the need for cutouts in the bus bars at junction points and that permits joints and branch connections at any desired position along the bus line.

This object is achieved by a clamping device having spaced apart members adapted to embrace a stack of bus bars. In this way, the clamping device does not interfere with the bars, and a stack of bars and separating spacers can be clamped at any desired position without further machining.

In the simplest embodiment, the clamping device comprises a U-shaped bracket adapted to straddle a bus bar stack, a pressure member bridging and guided by the legs, and adjustable clamping means mounted on the legs for applying pressure on the stack of bus bars through the pressure member. In a preferred form, the U-bracket is a U-bolt having threaded legs, and the adjustable clamping means are nuts threaded on the ends of the legs.

To provide a resilient clamping force for accommodating thermal expansion and contraction of the bus bars, it is further desirable to include spring washers between at least one of the nuts and the pressure member. Alternatively, the pressure member can be designed to provide the desired degree of resilience.

Another embodiment of the coupling comprises a support forming one of the spaced apart members of the clamping device and a clamping element forming the other of the spaced apart members. A pair of lever means join the opposite ends of the support to the clamping element and are adapted to embrace a stack of bus bars. Clamping means are mounted on the clamping elements for applying pressure on the stack through the lever means.

Since the force exerted on the bus bar stack depends on the distances from the support and from the clamping element to the point of contact of the lever with the stack, proper selection of the ratio between these two values will permit a corresponding ratio between the resulting forces in the clamping element and the support. Thus, for example, if the support has relatively high strength for reasons other than its function as part of the clamping device, the levers can be designed to distribute a proportionally greater share of the clamping load to the support, thereby allowing the use of a lighter clamping element.

As in the case of the U-bracket embodiment of the clamping device, it is desirable to apply a resilient clamping force to the bus bar stack, either by use of springy levers or by spring washers or equivalent means interposed between the clamping means and the levers. The clamping element may be a threaded rod, with the clamping means being nuts threaded on each end of the rod.

The second embodiment of the coupling is particularly suitable for incorporation into a junction box or bus bar enclosure. It can also be provided with additional fastening means for attachment to a bulkhead, ceiling, or other structural member and thereby serve as a simple mounting for the bus bar stack.

In one modification of the second embodiment the support comprises the housing of a junction box; while in another modification the support comprises a cover for a bus bar stack, with the clamping element being positioned between the support and the bus bar stack.

In a further modification of the second embodiment, the support includes an insulating tray having a U-shaped cross section, with the open side of the U facing the clamping element. The upright walls of the tray are provided with spaced slots conforming to the profiles of the bus bars for supporting each bar section in proper relation to the other bar sections. Specifically, the slots in one wall are longitudinally offset from the corresponding slots in the opposite wall so that the end of one bar section will overlap the end of the next bar section of the same potential. By leaving a space between the end of each bar section and the tray wall opposite the supporting slot for that bar, room can be provided for thermal expansion of the bars under electrical load while still retaining the bar within the insulated boundaries of the tray. Each bar is supported on one side of the tray by the respective slot, and the opposite wall serves as a limiting stop for longitudinal expansion of the bar. In the case of a vertical bus bar system, a simpler L-shaped version of the tray can be used that has only one side wall with appropriately spaced and profiled support slots for the bars.

Further aspects and advantages of the invention will be described in connection with the preferred embodiments illustrated in the drawings.

BRIEF DESCRIPTION OF THE DRAWINGS

FIG. 3 is a side view of another embodiment of a coupling according to the invention.

FIG. 4 is a top view of the coupling of FIG. 3.

FIG. 5 is an end view of the bus bar arrangement according to FIG. 3, with the coupling removed.

FIG. 12 is a side view of a coupling similar to the embodiment of FIG. 3 but including an insulated support tray for the bus bars.

FIG. 13 is a top view of the embodiment of FIG. 12.

FIG. 14 is an end section view of the embodiment of FIG. 12 taken along line XIV—XIV of FIG. 12.

DESCRIPTION OF THE PREFERRED EMBODIMENTS

Figure 1:
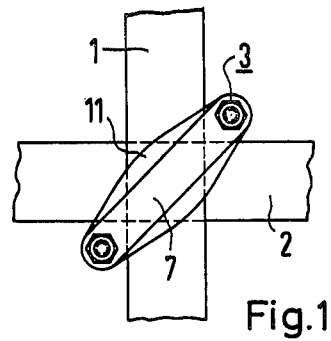
FIG. 1 is an end view of one embodiment of the coupling of the invention used for joining one stack of bus bars with another perpendicular stack.
Figure 2:
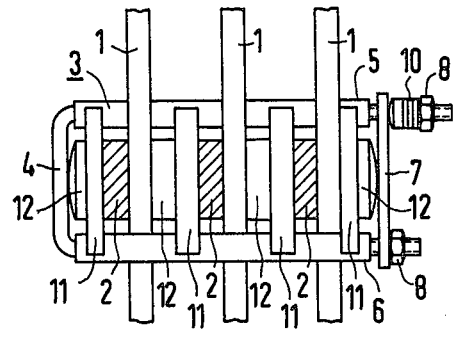
FIG. 2 is a side view of the embodiment of FIG. 1.

In FIGS. 1 and 2 a stack of bus bars 1 is interleaved with another stack of bus bars 2 extending at right angles to the first stack. The two stacks are clamped together by a clamping device 3 in the form of a U-shaped bracket or U-bolt having a cross member 4 for spacing apart elongated legs 5 and 6 that are adapted to straddle the junction of the two bus bar stacks. A pressure member 7 bridges between the ends of the legs to enclose the straddled stacks of bus bars, and adjustable clamping means such as nuts 8 are threaded on the ends of the U-bolt legs for applying pressure on the stacks of bus bars through one or more spring washers 10.

Each contiguous pair of bus bars 1 and 2 are at the same potential and are spaced from adjacent pairs of bus bars (which are at different potentials) by movable wider spacers 11, which engage the legs of the U-bolt for guidance, and narrower spacers 12 of insulating material. If desired, the two spacers 11 and 12 can also be made in one piece.

Referring to FIG. 3, an alternate embodiment of the coupling includes a clamping device 3 having a support 20 for lever means 21 and 22 and a clamping element 23 in the form of a threaded rod for joining the other ends of the lever means. Support 20 and clamping element 23 are spaced apart by lever means 21, 22 so as to straddle a stack of overlapping bus bar sections 1 and 2 separated by insulating spacers 12. Clamping pressure is applied to the stack of bus bars and spacers, through levers 21, 22 and pressure plates 25 (for protecting insulating spacers 12), by clamping means such as nuts 8 which are threadably engaged at each end of the clamping element 23 and exert pressure through spring washers in the same manner as described for the previous embodiment. The levers 21 and 22 include protrusions or contact portions 24 which make contact with the pressure plate 25.

In addition to providing a coupling at the junction between bus bar sections 1 and 2 in a distribution line, the clamping device shown in FIG. 3 includes connection tabs 26 that permit making branch connections to the bus bar line. These connection tabs are clamped against each pair of bus bars of corresponding potential and include circular cutouts 27 through which the clamping element 23 is passed, thereby giving further support to the connection tabs. A tube 28 of insulating material is slipped over the clamping element 23 to electrically insulate the clamping device from the connecting tabs 26.

FIGS. 4 and 5 further illustrate in top and end views, respectively, the coupling arrangement of FIG. 3 and the relative orientation of the bus bars 1 and 2 to the connection tabs 26. It is evident that the bus bars 1 and 2 and as well as connecting tabs 26 must be insulated from support 20 as well as from clamping element 23, unless the support itself is made of insulating material.

Figure 6:
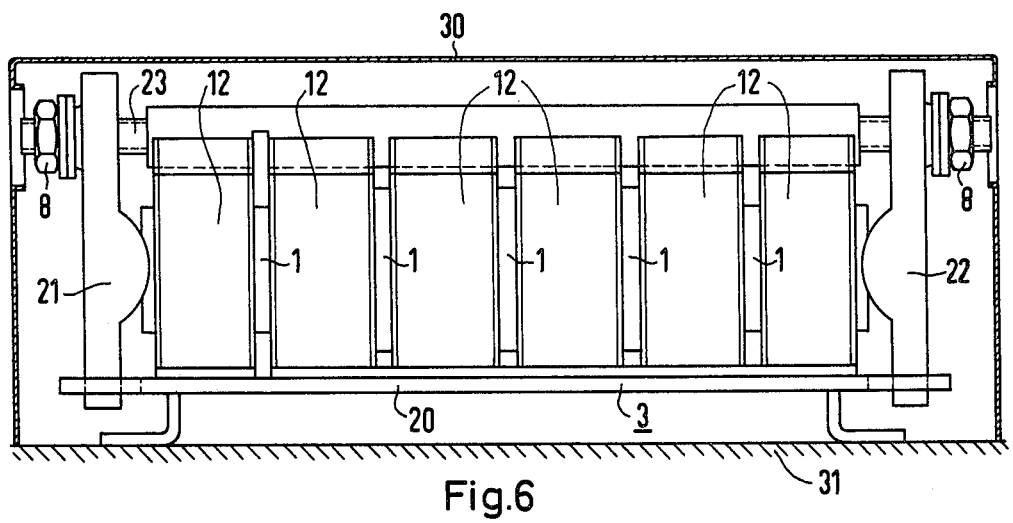
FIG. 6 is a side view of the coupling of FIG. 3 mounted within a protective enclosure.

Turning next to FIG. 6, the embodiment of FIG. 3 is shown surrounded by a protective enclosure 30, and the support 20 is attached by suitable members to a bulkhead or other structural member 31. The clamping nuts 8 can be adjusted on threaded clamping element 23 by a socket wrench inserted through holes in the enclosure coaxial with the clamping element. In FIG. 6 only a single stack of bus bars is clamped.

Figure 7:
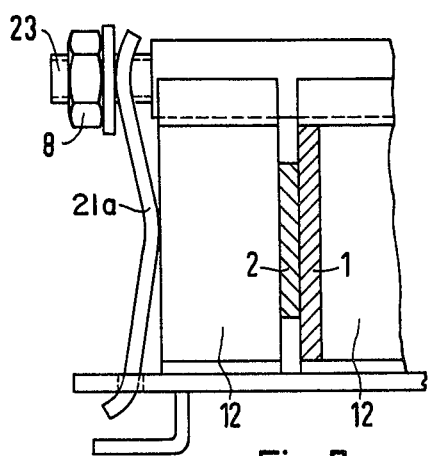
FIG. 7 is a portion of a side view of the coupling of FIG. 3 showing an alternative lever means.
Figure 8:
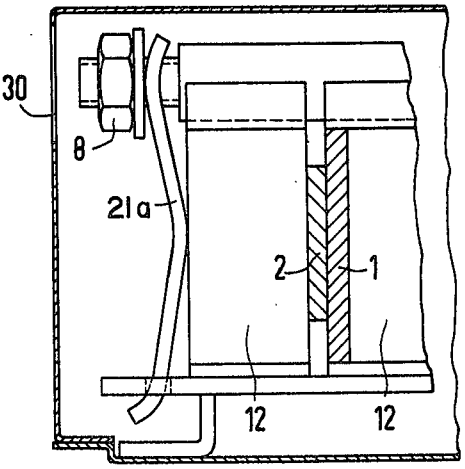
FIG. 8 is a side view of the embodiment of FIG. 7 in a protective enclosure.

In the previous embodiments the pressure member 7 of FIG. 2 or the lever means 21, 22 of FIGS. 3–6 are designed to be relatively rigid. With such a design, energy-storing devices such as spring washers should be used to permit thermal expansion of the bus bars under electrical loading. FIG. 7 illustrates an alternate arrangement in which the lever means 21a is itself designed to be springy or resilient instead of rigid. It is also possible to design the clamping element 23 to be springy. FIG. 8 depicts the embodiment of FIG. 7 enclosed in a protective enclosure 30 in the manner of FIG. 6.

Figure 9:
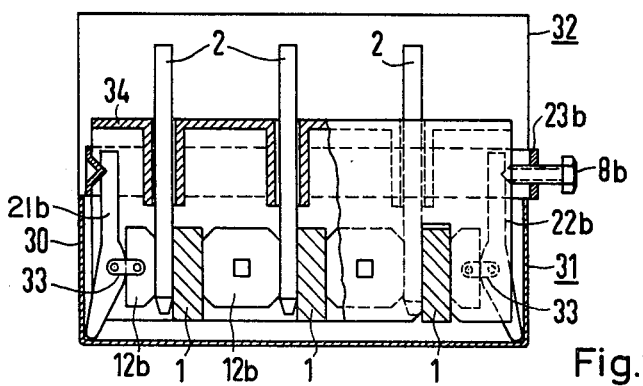
FIG. 9 is another embodiment of a coupling according to the invention incorporated in a junction box.

As shown in FIG. 9, an alternate embodiment of the coupling is designed to form part of a junction box 30. The housing is divided into a lower housing 31 and an upper enclosure 32. In this embodiment, the clamping device, which includes levers 21b, 22b as well as clamping element 23b, is arranged in the lower housing 31, which also functions as a support for the lower ends of the lever means. Insulating spacers 12b are placed between overlapping pairs of bus bar sections 1 and 2 and also between the outer pairs of bus bar sections and lever means 21b, 22b, which are connected to their adjacent insulating spacers by means of links 33. The spacing insulators 12b also are fastened at their ends to housing 30.

In this embodiment, the clamping means 8b is in the form of a screw threaded into a mating hole in the end of clamping element 23b. Because of the lever action of lever means 21b and 22b, the force exerted by clamping means 8b can be considerably smaller than the clamping force exerted by the lever means against the bus bar stack through the links 33. By the well known law of the lever, the ratio of the force exerted by the clamping means 8b and the clamping force on the bus bar stack is equal to the ratio between the distance from the lower ends of levers 21b and 22b (supported at the corners of housing 30) to the clamping point at links 33 and the distance from said lower ends to the point of screw 8b. Inside of upper enclosure 32 of the junction box there is a cover 34 having openings for the branch-off bus bars 2.

Figure 10:
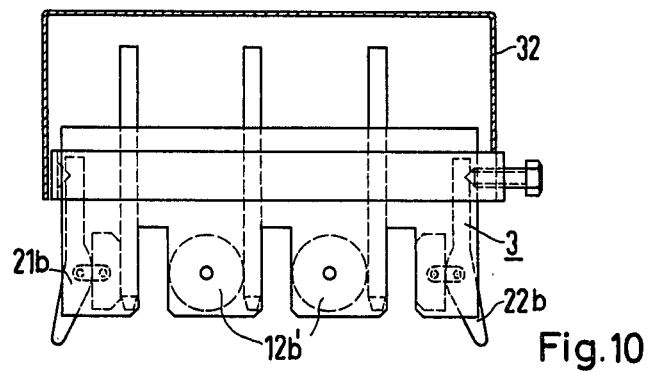
FIG. 10 is a side view of the coupling of FIG. 9 in which the clamping means forms part of the junction box.

In FIG. 10, a coupling similar to the embodiment of FIG. 9 is shown in which the clamping device 3 is arranged in the upper enclosure 32 of the junction box instead of to the lower housing 31. In this embodiment, the intermediate insulating spacers 12b are cylindrical instead of rectangular as in FIG. 9, thereby facilitating their placement on the bus bars. Not shown in FIG. 10 is a lower housing of the junction box which serves as the support portion of the clamping device in the same manner as in the embodiment of FIG. 9.

Figure 11:
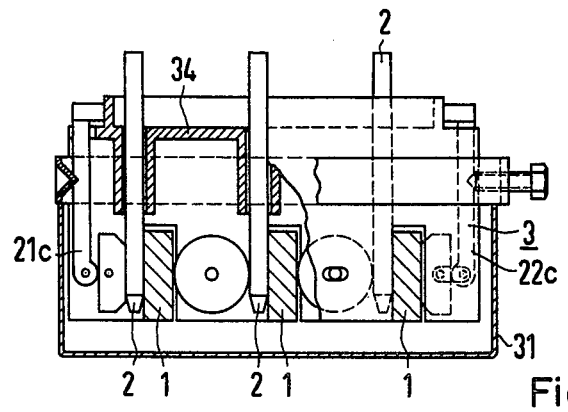
FIG. 11 is a side view of the embodiment of FIG. 9 in which the clamping means forms part of an enclosure for the bus bar system.

Referring next to FIG. 11, the lower housing 31 of the junction box is illustrated which incorporates a variation of the embodiment of FIG. 9. Here the clamping device 3 is arranged in the lower housing 31, as in FIG. 9, but cover 34 on the other side of the clamping element is used as the support for levers 21c and 22c. In this arrangement, therefore, both the support and the clamping element are on the same side of the bus bar stack, and the tension force in the clamping element exerted by the clamping screw is equal to the sum of the clamping force on the bus bar stack and the compression force exerted by the upper ends of the levers on the cover 34.

In the embodiment of FIGS. 12–14, a clamping device of the type shown in FIG. 3 includes a tray 40 of insulating material positioned between support 20 and the bus bar stack. The tray is U-shaped in cross section and is arranged to open toward the clamping element 23. Spaced slots 41 in one wall of the tray are longitudinally offset from equally spaced slots 42 in the opposite wall by a distance to permit one stack of bar sections 1 (when supported in slots 41) to overlap the ends of the next set of bar sections 2 (which are supported in slots 42). Each set of slots 41 and 42 is shaped to accommodate the corresponding profiles of bar sections 1 and 2. In this way, bar sections 1 are supported by the slots 41 in the front wall of the tray (when viewed from the direction of FIG. 12), and bars 2 are supported by the slots 42 in the rear wall of the tray. As shown in FIG. 13, a space 50 has been left between the ends of bars 2 and the front wall of the tray to provide room for thermal expansion.

Tray 40 can be made of insulating material, or it may be lined with insulating material. It may be open at each end facing levers 21 and 22. In a modified version, it may have merely an L-shaped instead of a U-shaped cross section, with slots cut in the upstanding wall of the tray for both the incoming and outgoing bus bar sections. This version is particularly suitable for vertical bus bar runs, where displacement in only one direction need be considered.

As shown in FIGS. 12 and 14, tray 40 is fastened to support 20 by machine screws 43, which also attach the coupling to brackets 44 for mounting on a bulkhead or in an enclosure.

I claim:
1. A coupling for a bus bar system having a plurality of bus bars at different potentials arranged in a stack, the coupling including a clamping device for pressing together sections of bus bars of the same potential separated by insulating spacers from bars of different potential comprising:
   a. support in the form of an insulated tray having a U-shaped cross section, the walls of said insulated tray having spaced slots conforming to the profiles of the bus bars to be supported such that, when said coupling is used, said tray will support each bar section in proper relation to the other bar sections;
   b. a clamping element spaced from the support, the open side of the U facing said clamping element;
   c. a pair of lever means extending between corresponding ends of the support and the clamping element and adapted to embrace a stack of bus bars; and
   d. adjustable clamping means mounted on the clamping element for applying pressure on a stack of bars through said lever means.

2. A coupling according to claim 1 wherein at least one of said lever means comprises a resilient member for applying a spring biasing force against the stack of bus bars.

3. A coupling according to claim 1 wherein said clamping element comprises a threaded rod, and said clamping means comprise nuts threaded on the ends of said rod.

4. A coupling according to claim 3 comprising spring washers positioned between at least one of the nuts and the corresponding lever means for providing a resilient biasing force against the lever means.

5. A coupling according to claim 1 wherein said support comprises part of an enclosure for a bus bar system.

* * * * *